United States Patent [19]

Chiu

[11] 3,981,046

[45] Sept. 21, 1976

[54] PROCESS FOR PRODUCTION OF SHIRRED MOISTURIZED FOOD CASINGS

[75] Inventor: Herman Chiu, Chicago, Ill.

[73] Assignee: Union Carbide Corporation, New York, N.Y.

[22] Filed: May 5, 1972

[21] Appl. No.: 250,583

[52] U.S. Cl. .................................. 17/49; 426/420
[51] Int. Cl.² .................................... A22C 13/00
[58] Field of Search........... 99/176, 175; 117/143 R, 117/144, 145; 17/42, 51, 49; 426/140, 420, 138, 139, 135

[56] References Cited
UNITED STATES PATENTS

| | | | |
|---|---|---|---|
| 1,868,203 | 7/1932 | Henderson et al. | 426/140 |
| 2,346,417 | 4/1944 | Cornwell et al. | 117/145 |
| 3,222,192 | 12/1965 | Arnold et al. | 17/49 |
| 3,383,223 | 5/1968 | Rose | 426/420 |
| 3,451,827 | 6/1969 | Bridgeford | 426/420 |
| 3,533,808 | 10/1970 | Cameron | 426/135 |
| 3,657,769 | 4/1972 | Martinek | 17/42 |

OTHER PUBLICATIONS

Condensed Chem. Dict., 7th Ed., 1966, pp. 288, 483, 452–453, 791–792.

*Primary Examiner*—Louis G. Mancene
*Assistant Examiner*—James D. Hamilton
*Attorney, Agent, or Firm*—Franklyn Schoenberg

[57] ABSTRACT

Food casings, particularly cellulosic sausage casings, are moisturized during the conventional shirring operation by applying to the interior of the casing stock prior to shirring an aqueous solution of humectant, the solution containing sufficient humectant to retard excessive imbibition of water by the casing.

18 Claims, No Drawings

PROCESS FOR PRODUCTION OF SHIRRED MOISTURIZED FOOD CASINGS

This invention relates to new and useful improvements in the shirring of food casings and refers more particularly to the simultaneous shirring and humidification of such casings.

Synthetic sausage casings, particularly casings formed of regenerated cellulose, are prepared as hollow, thin walled tubes of very great length. For convenience in handling, these casings are shirred from lengths ranging from 55 to 160 ft. or more down to a shirred and compressed length of the order of a few inches. Shirring machines and the products thereof are shown in Matecki U.S. Pat. Nos. 2,983,949 and 2,984,574 among others.

In the preparation and use of synthetic sausage casings, particularly casings formed from regenerated cellulose, the moisture content of the casings has been of extreme importance. When the casings are first formed, it has been necessary that they be dried to a relatively low water content usually in the range of about 8 to 11%. A lower water content in the casing generally results in damage to the casing during the shirring operation and sometimes makes shirring completely impossible. Similarly, a high water content has resulted in damage to the casing during shirring usually resulting from the casing sticking to the shirring mandrel.

After a casing is shirred, it is packaged and eventually shipped to a meat packing house where an individual shirred stand is placed on a stuffing horn and a meat emulsion extruded to fill the casing to its fully extended length. The stuffing of the casing usually takes place within a few seconds with the result that the casing is extended from a shirred length of 10 to 27 inches to an extended length of 55 to 160 ft. or more in a matter of 10 to 30 seconds. This rapid extension of the casing during stuffing requires the casing to be especially strong and resistant to tearing. If even minor holes develop in the casing, the casing may split or break during stuffing and waste a large quantity of meat.

In the shirring of synthetic sausage casing, the pleats which are formed are sometimes interlocked and are almost always nested in a concave manner to provide a tightly compressed strand of casing for shipment and handling. The tightly compressed and sometimes interlocked pleats require a higher moisture content to permit extension of the casing during the stuffing operation without tearing or breaking the casing. In general, an average moisture content of about 14 to 17% has been required. If the shirred casing has a moisture content appreciably less than about 14%, there is a tendency toward excessive breakage during stuffing. Likewise, if the casing has a moisture content appreciably in excess of about 17%, the casing is too plastic. It is, therefore essential that shirred casing be humidified to a relatively narrow, critical moisture content which is very uniform throughout the length of the casing to permit stuffing without excessive breakage.

In the past, shirred synthetic sausage casings have been packaged in cartons or containers which are apertured at opposite ends to permit the circulation of moist air through the shirred casing strands to produce the desired moisture content in the casings. A package was developed for shirred casings, as shown in Hewitt U.S. Pat. No. 2,181,329, and Milio et al. U.S. Pat. No. 3,028,952 which had a plurality of apertures at opposite ends and which would contain a large number of shirred casings. These packages were designed to permit the packaging of a number of shirred casing strands while providing for circulation of moist air through and about the strands to bring the moisture content to the level required for satisfactory stuffing. They are subject to substantial objections in commercial use. They are expensive to make because of the spaced perforations required in the ends of the cartons and they suffer from mechanical weakness in the perforated end walls which may result in breakage of the end walls from time to time.

As the casing industry has tended to produce longer and longer shirred strands, e.g. today strands up to 160 ft. are shirred, the problem of humidifying casings to the critical moisture content required for satisfactory stuffing has become increasingly difficult. There is a considerable resistance to flow of moist air through the bore of the casing with the result that the ends of the casing tend to be more moist and the center of the casing less moist. Also, the moist air humidification technique has not been entirely practical for the humidification of heavy gauge casings and fibrous casings used for packaging of larger sausages and chunks and pieces of meat. Additionally, because of the increasing use of "closed end" casings, this method of moisturizing or humidifying casings becomes less practical.

Because of these disadvantages, the industry has attempted to overcome them by moisturizing the casing during the shirring operation. In Arnold U.S. Pat. No. 3,222,192, it was proposed to apply water to the casing at the shirring head. To facilitate rapid distribution of the water throughout the casing, a wetting agent was used with the water. The preferred method of application was to the exterior of the casing in the Arnold patent disclosure. Difficulty has been encountered in exterior application in metering the water, and this tends to produce nonuniformity. It was also suggested in the Arnold patent that the mixture of water and wetting agent could be applied to the interior of the casing through the shirring mandrel.

Experience has shown, however, that in commercial shirring operations the imbibition by the casing of water applied either externally or internally in accordance with the teaching of the Arnold disclosure is entirely too rapid and causes the problems referred to above, this is seizing of the casing on the mandrel and damage to the casing. In normal commercial shirring operations generally at least three interruptions occur in shirring each reel of flat stock, because of splices in the flat casing for instance, and every time shirring is stopped the casing has time to imbibe water. The addition of even minute quantities of wetting agent to the water does not prevent too rapid imbibition of water by the casing during such interruptions. Thus the desired control of moisturization was difficult to attain in routine commercial operation.

Consequently, it has been proposed to apply water to the shirred casing stick prior to or subsequent to its removal from the shirring mandrel, but this sort of expedient merely substitutes one type of post-shirring treatment for another and does not attain the theoretical advantages of moisturizing during shirring.

Accordingly, it is one object of this invention to provide a new and improved method for humidifying or moistening synthetic sausage casings.

Another object of the invention is to provide a new and improved method of humidifying or moisturizing synthetic sausage casings during a shirring process.

The invention by means of which these objects are achieved comprises a process in which an aqueous solution containing at least about 25% humectant is applied to the interior of cellulosic casing stock prior to shirring the casing. Preferably, the solution is applied to the casing as the flat casing is being inflated prior to placement over a shirring mandrel. As used herein a "humectant" is a material having a physico-chemical attraction for water. In the process of the invention, the humectant, being more receptive to water than the casing stock, retards imbibition of water by the casing. By properly proportioning the quantity of water in the solution to the size of the casing to be treated and the speed at which the casing is shirred, quite precise control of moisturizing is attained without encountering the problems which have hitherto plagued the industry.

For use in the process of the invention a humectant must have a number of properties. Of course it must be hydrophilic and must not react chemically with water. It must be water soluble, and the solution formed must be inert to the casing and must not be high in viscosity, nor should it be tacky. The solution to be used on food casing must be one approved for food use. It must not present hazards such as fire or explosion during use and must impart no objectionable odor to the casing, and casing treated with it must impart no objectionable taste to food to be encased in it.

Humectants suitable for use in the process of the invention include polyols, such as glycerine, triethylene glycol, propylene glycol, and polyethylene glycols; esters of polyols, for example glycerol mono acetate, glycerol diacetate ("diacetin"); and polysaccharides such as sucrose, dextrose, fructose and glucose. Of the materials mentioned, propylene glycol is preferred, for it meets the stated requirements and is relatively less expensive than other materials. Furthermore, the quantity of propylene glycol in aqueous solution can be varied more widely than that of other humectants, for instance sucrose, and thus a better control of water imbibition in the food casing can be attained. Of course, a mixture of two or more humectants can be used.

Although as indicated it is believed that the humectant in the aqueous solution retards the imbibition of water by the casing in the practice of the invention, the surprising fact is that, as manufactured, the casing contains a substantial quantity of glycerine which is a good humectant for use in the invention. This glycerine is present in the flat casing by reason of its use as a plasticizer during manufacture. Yet if water alone is applied to the casing during shirring no matter the glycerine content (within commercial limits, of course) the casing imbibes the water too quickly with the disadvantage discussed above.

Casing produced by the process of the invention is distinguished over post-shirring, moisturized casing by the presence of the conventional glycerine plasticizer plus humectant, the total quantity of glycerine and humectant being greater than the quantity of glycerine in the flat stock from which the shirred casing was manufactured. Thus, a shirred stick of casing produced by the process of the invention using glycerine as humectant will contain more glycerine than the flat stock from which the stick was made. However, it is entirely possible, depending on water and glycerine content in flat casing stock, that a shirred stick produced by the invention using glycerine as a humectant may contain less glycerine than a shirred stick which has not been moisturized according to the invention but is produced from a different flat stock. In calculating the glycerine content of cellulosic casing, it is the practice to make the calculation on a "bone dry" basis, that is to ignore the water content.

Since the principal objective of the invention is to increase the water content of cellulosic casing by a definite, uniform amount, and at a controlled rate over the entire length of the casing stock, the concentration of water in the treating solution is of significant importance. Treatment with water alone leads to too rapid imbibition by the casing. On the other hand, if the treating solution is too low in water content, the quantity of solution required to be used may be so great as to introduce problems of uniformity in later stages of shirring. Such difficulty may outweigh the advantages sought to be gained.

This is an important reason for the preference for propylene glycol. Solutions containing 30 to 60% propylene glycol and 70 to 40% water may be used, about 60% propylene glycol being preferred. In the case of sucrose the range is more limited because if the sucrose content is more than about 30%, the viscosity and tackiness of the solution become great enough to cause handling problems.

In selecting a treating solution for the practice of the invention, consideration should be given to the moisture content of the flat casing stock. If, for instance, the moisture content is at the low end of the usual range, a substantial quantity of water needs to be added. In such case the treating solution should contain less humectant then would be the case if the flat stock moisture content were higher.

In treating conventional cellulosic casing during shirring at the usual rate, about 1000 feet per minute, on commercial machines, it has been found that to raise the water content of the casing 1%, there must be supplied to the casing about 0.4 milligram of water per square inch of casing. Thus in a solution containing 40% water, 1 milligram of solution must be applied to each square inch of inside surface of the casing to raise the moisture content of the casing 1%. To cite a specific instance of a casing containing about 11% water prior to shirring, to increase the moisture content to 14.5% using an aqueous solution of propylene glycol containing 40% water, 3.5 milligrams of solution must be applied to each square inch of inside surface of the casing by the process of the invention. It should be noted that in calculating the percentage of water in the casing, it is conventional to report the water in relation to the total mass of casing including plasticizers or other materials in or on the casing.

The effectiveness of the humectant in aqueous solution in retarding imbibition of water by casing can be determined in the laboratory by a simple test. Thus, an indicator solution of dipicrylamine in dioxane is prepared. This solution changes color from light yellow to red-orange in the presence of water. To determine the wetting rate of casing, to the inside of the casing is applied the solution to be tested and to the outside is applied the indicator solution. The time elapsed to produce a color change is an indication of the imbibition rate. In the following table are set forth results obtained in such tests with different solutions:

Table I

| Solution | | Time for color change |
|---|---|---|
| H₂O | | 7.4 seconds |
| 25% | propylene glycol, rest H₂O | 16.3 seconds |
| 30% | " | 17.0 " |
| 40% | " | 26.0 " |
| 50% | " | 36.0 " |
| 60% | " | 96.0 " |
| 30% | sucrose, rest H₂O | 12.0 " |

From the test results of Table I it will be seen that the imbibition of water by cellulosic casing is effectively retarded by application to the casing of an aqueous solution of a humectant and that the degree of retardation can be controlled by changing the concentration of the solution used. It will also be noted that the preferred solution, 60% propylene glycol-40% water was far more effective than the 30% sucrose-70% water solution tested in requiring 8 times as long for the color change to occur.

The following examples will serve to illustrate the principles of the invention and will tend to demonstrate its flexibility as well. In the examples the solution was applied to the interior of the casing just in advance of the shirring rolls of a shirring machine of the type disclosed in Matecki U.S. Pat. No. 2,983,949. The solution was applied to the casing during inflation through the shirring mandrel in a fine spray. This is the preferred mode of delivering the solution to the casing interior.

EXAMPLE 1

Casing having a flat width of 1.3 inches was used to produce shirred lengths of 95 feet. To its interior was supplied, just prior to passage of the casing through the shirring zone, an aqueous solution containing 25% propylene glycol, 75% water. The solution was applied at an average rate of 5.88 milligrams per square inch of interior casing wall. Difficulty was encountered in "stringing up", that is starting the casing over the mandrel after an interruption. The casing had a tendency to seize on the mandrel, and stripping the shirred casing from the mandrel was difficult.

EXAMPLE 2

The same type and size of casing used in Example 1 was shirred under the same conditions except that an aqueous solution containing 30% propylene glycol, 70% water was applied at an average rate of 2.2 milligrams per square inch of interior casing wall. No difficulty of any kind was encountered during shirring 100 sticks under normal production conditions.

EXAMPLES 3 to 5

The same type of casing used in Examples 1 and 2 were shirred using an aqueous solution of 40% propylene glycol, 60% water. In one instance (Example 3) the solution was applied at an average rate of 2.57 milligrams per square inch. No problems were encountered. In another instance (Example 4) the solution was applied at an average rate of 3.05 milligrams/sq. in. and in a third (Example 5) the solution was applied to the interior of the casing at an average rate of 3.6 mg./sq. in. In Example 4 the moisture content of the casing was raised from about 11.3 to 14.4 to 15%. In Example 5 the moisture content of the casing was raised from 10 to 14.8 to 16%. No problems were encountered in Examples 3, 4 or 5.

EXAMPLE 6

The same type of casing was used on the same machine used in Examples 1 to 5. The moisturizing solution contained 40% propylene glycol, 60% water. It was applied to the casing at an average rate of 7.73 mg./sq. in. The moisture content of the casing was raised from about 12 to more than 17%. In this case, some string-up problems were encountered after shirring interruptions, indicating that too much liquid was being applied.

EXAMPLE 7

Casing stock of the same type and size used in the preceding Examples was employed to produce sticks 88 feet in length on a different machine. The moisturizing solution contained 25% glycerine, 75% water. It was applied to the casing at a rate of about 5.3 grams per stick. No problem was encountered.

EXAMPLE 8

Example 7 was repeated using a solution containing 30% glycerine, 70% water delivered at a rate of about 5.95 grams per stick. No problem was encountered.

EXAMPLE 9

The same type and size of casing used in Examples 7 and 8 was shirred on the same machine using a moisturizing solution containing 30% polyethylene glycol (available commercially under the trade designation "Carbowax 400"), 70% water at an average rate of 5.55 grams per stick. No problems were encountered in shirring.

EXAMPLE 10

A solution containing 15% propylene glycol, 15% sorbitol, 70% water was used at an average rate of 5.65 grams per stick to moisturize the same size and type of casing used in Examples 7 to 9. No shirring problems were encountered, but the solution was rather tacky.

EXAMPLE 11

Again, the same size and type of casing used in Examples 6 to 10 was shirred on the same machine to produce the same length of stick. The moisturizing solution contained 40% diacetin (glycerol diacetate), 60% water. It was applied at an average rate of 9.97 grams per stick. No problems were encountered.

EXAMPLE 12

On the same machine used in Examples 1 to 6 and using the same type and size of casing, sticks 95 feet in length were produced. A moisturizing solution containing 30% sucrose, 70% water was used at an average rate of 6.8 grams per stick. In preparing 50 sticks the casing was deliberately broken to determine if there would be any string-up problem. There was none.

From the foregoing examples of the practice of the invention under actual commercial conditions, it will be seen that effective moisturization is attained without encountering shirring problems. Although in these examples relatively small diameter casings have been treated, the invention is applicable to all cellulosic casing including large diameter casing and casing having a fibrous web. It is particularly suited to the treatment of externally coated casing. Although the process of the invention may be used without the use of internally applied lubricant, lubricant may be applied internally of the casing in conventional manner if desired. In practising the invention with large diameter casing it is convenient to apply the solution to the casing interior by the well known "slugging" technique.

I claim:

1. A process for producing shirred cellulosic casing having a predetermined uniform moisture content which comprises
    a. providing a supply of cellulosic casing stock to be moisturized;
    b. advancing said cellulosic casing about a hollow mandrel to and through a shirring apparatus;
    c. applying to the interior surface of casing stock advancing over the hollow mandrel and prior to advancing through the shirring zone of a shirring apparatus a uniform predetermined rate and quantity of an aqueous solution containing at least about 25% humectant; and
    d. shirring said moisturized casing stock thereafter.

2. A process as defined by claim 1 in which said solution is applied at a rate of 0.4 milligram of water in said solution to each square inch of interior wall of casing stock for each 1% rise in water content of said casing stock.

3. A process as defined by claim 1 in which said humectant is a polyol.

4. A process as defined by claim 3 in which said polyol is propylene glycol.

5. A process as defined by claim 4 in which said solution contains about 40% propylene glycol.

6. A process as defined by claim 5 in which said solution is applied to said casing stock at an average rate of 1 milligram per square inch of interior casing wall for each 1% rise in water content of said casing stock.

7. A process as defined by claim 3 in which said polyol is glycerine.

8. A process as defined by claim 1 in which said humectant is a polysaccharide.

9. A process as defined by claim 8 in which said polysaccharide is sucrose.

10. A process as defined by claim 1 in which said humectant is a polyol ester.

11. A shirred stick of cellulosic food casing comprising a shirred cellulosic food casing having a moisture content between about 14 and 17% by weight of water and containing a mixture of humectants comprising glycerine and at least one humectant other than glycerine, the amount of glycerine present in said casing being suitable to plasticize the cellulosic food casing and a humectant other than glycerine being present in said casing in an amount of at least about 0.3 mg humectant per sq. inch of internal casing surface.

12. A shirred casing stick as defined in claim 11 wherein the humectant other than glycerine is a humectant selected from the group consisting of a polyol, esters of polyols, polysaccharides and mixtures of the same.

13. A shirred casing stick as defined in claim 11 wherein the humectant other than glycerine is a polyol selected from the group consisting of triethylene glycol, propylene glycol, polyethylene glycol and mixtures of the same.

14. A shirred casing stick as defined in claim 13 wherein said humectant is propylene glycol.

15. A shirred casing stick as defined in claim 11 wherein the humectant other than glycerine is a polyol ester.

16. A shirred casing stick as defined in claim 15 wherein said polyol ester is glycerol diacetate.

17. A shirred casing stick as defined in claim 11 wherein the humectant other than glycerine is a polysaccharide.

18. A shirred casing stick as defined in claim 17 wherein said polysaccharide is sucrose.

* * * * *

UNITED STATES PATENT OFFICE
CERTIFICATE OF CORRECTION

Patent No. 3,981,046    Dated September 21, 1976

Inventor(s)   Herman S-G Chiu

It is certified that error appears in the above-identified patent and that said Letters Patent are hereby corrected as shown below:

Change the patentee's name to read: -- Herman Shin-Gee Chiu --

Column 5, line 67, "11.3 to 14.4" should read -- 11.3% to 14.4% --

Column 5, line 68, "10" should read -- 10% --

Column 6, line 1, "14.8" should read -- 14.8% --

Column 6, line 10, "12" should read -- 12% --

Column 8, lines 7 to 38, delete claims 11 to 18

On the cover sheet, "18 Claims" should read -- 10 Claims --.

Signed and Sealed this

Twenty-first Day of March 1978

[SEAL]

Attest:

RUTH C. MASON
*Attesting Officer*

LUTRELLE F. PARKER
*Acting Commissioner of Patents and Trademarks*